(12) United States Patent
Bae et al.

(10) Patent No.: US 12,548,847 B2
(45) Date of Patent: Feb. 10, 2026

(54) RECHARGEABLE BATTERY MODULE

(71) Applicant: SAMSUNG SDI CO., LTD., Yongin-si (KR)

(72) Inventors: Kwangsoo Bae, Yongin-si (KR); Jae-Seung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 18/487,928

(22) Filed: Oct. 16, 2023

(65) Prior Publication Data

US 2024/0195004 A1    Jun. 13, 2024

(30) Foreign Application Priority Data

Dec. 7, 2022  (KR) .................. 10-2022-0169818
Sep. 13, 2023  (KR) .................. 10-2023-0121977

(51) Int. Cl.
*H01M 50/213* (2021.01)
*H01M 50/30* (2021.01)

(52) U.S. Cl.
CPC ......... *H01M 50/30* (2021.01); *H01M 50/213* (2021.01)

(58) Field of Classification Search
CPC .............. H01M 50/30; H01M 50/213; H01M 2220/20; Y02E 60/10
USPC ......................................................... 429/53
See application file for complete search history.

(56) References Cited

U.S. PATENT DOCUMENTS

| | | | |
|---|---|---|---|
| 7,361,428 B2 * | 4/2008 | Watanabe | H01M 50/147 429/96 |
| 9,941,496 B2 | 4/2018 | Murai et al. | |
| 10,158,102 B2 * | 12/2018 | Wu | H01M 50/3425 |
| 2008/0085450 A1 | 4/2008 | DePalma | |
| 2011/0008654 A1 | 1/2011 | Kim et al. | |
| 2011/0171505 A1 | 7/2011 | Kishll et al. | |
| 2011/0195284 A1 * | 8/2011 | Yasui | H01M 50/227 429/82 |

(Continued)

FOREIGN PATENT DOCUMENTS

| | | |
|---|---|---|
| EP | 3 828 987 A1 | 6/2021 |
| JP | 2010-505229 A | 2/2010 |

(Continued)

OTHER PUBLICATIONS

Extended European Search [or and Examination] Report issued in corresponding EP Application No. 23211960.2, dated Apr. 29, 2024, 7 pages.

(Continued)

*Primary Examiner* — Christian Roldan
(74) *Attorney, Agent, or Firm* — Womble Bond Dickinson (US) LLP (57) ABSTRACT

A rechargeable battery module including: a plurality of battery cells, each of the battery cells having a vent hole; a first holder accommodating one side of the battery cells; a second holder accommodating an opposite side of the battery cells, the second holder being coupled to the first holder with the battery cells therebetween; a first plate on one side of the second holder and an outlet group, the outlet group including a plurality of outlets at positions corresponding to the vent holes of a respective one of the battery cells; and a second plate on one side of the first plate and configured to intercept an emission discharged through the vent hole and the outlet group.

11 Claims, 7 Drawing Sheets

(56) References Cited

U.S. PATENT DOCUMENTS

| | | | |
|---|---|---|---|
| 2011/0200854 A1 | 8/2011 | Bak et al. | |
| 2015/0249278 A1* | 9/2015 | Park | H01M 50/264 |
| | | | 429/82 |
| 2016/0099451 A1 | 4/2016 | Murai et al. | |
| 2016/0336556 A1* | 11/2016 | Okutani | H01M 50/213 |
| 2019/0097203 A1* | 3/2019 | Kwag | H01M 50/512 |
| 2021/0167342 A1* | 6/2021 | Kwag | H01M 10/613 |
| 2021/0167347 A1* | 6/2021 | Kwag | H01M 50/204 |
| 2023/0021740 A1 | 1/2023 | Park et al. | |
| 2023/0291038 A1* | 9/2023 | Norimine | H01M 50/184 |
| 2023/0378599 A1 | 11/2023 | Lee et al. | |
| 2023/0416103 A1 | 12/2023 | Hong et al. | |
| 2024/0283117 A1 | 8/2024 | Hirano et al. | |

FOREIGN PATENT DOCUMENTS

| | | |
|---|---|---|
| JP | 2010-140695 A | 6/2010 |
| JP | 2011-171299 A | 9/2011 |
| JP | 2016-72171 A | 5/2016 |
| JP | 2017-91824 A | 5/2017 |
| JP | 2021-152987 A | 9/2021 |
| JP | 2023-551615 A | 12/2023 |
| KR | 10-2010-0041472 A | 4/2010 |
| KR | 2010041472 A * | 4/2010 ............ H01M 2/022 |
| KR | 10-2019-0034019 A | 4/2019 |
| KR | 2019034019 A * | 4/2019 ............ H01M 50/20 |
| KR | 10-2021-0067663 A | 6/2021 |
| KR | 10-2022-0017383 A | 2/2022 |
| KR | 2022017383 A * | 2/2022 .......... H01M 10/625 |
| KR | 10-2022-0023522 A | 3/2022 |
| WO | 2011/007547 A | 1/2011 |
| WO | WO 2022-031056 A1 | 2/2022 |
| WO | 2022/177158 A | 8/2022 |
| WO | 2023054498 A1 | 4/2023 |

OTHER PUBLICATIONS

Korean Office Action for KR Application No. 10-2023-0121977, dated Aug. 28, 2024, 6 pages.

Japanese Office Action for corresponding JP Application No. 2023-205328, dated Feb. 18, 2025, 6 pages.

Korean Notice of Allowance for corresponding KR Application No. 10-2023-0121977, dated Feb. 11, 2025, 8 pages.

Japanese Notice of Allowance issued in corresponding Japanese Patent Application No. 2023-205328, dated Aug. 5, 2025, 3 pages.

* cited by examiner

RECHARGEABLE BATTERY MODULE

CROSS-REFERENCE TO RELATED APPLICATION

This application claims priority to and the benefit of Korean Patent Application No. 10-2022-0169818, filed in the Korean Intellectual Property Office on Dec. 7, 2022, and Korean Patent Application No. 10-2023-0121977, filed in the Korean Intellectual Property Office on Sep. 13, 2023, the entire contents of which are incorporated herein by reference.

BACKGROUND

1. Field

Aspects of embodiments of the present disclosure relate to a rechargeable battery module.

2. Description of the Related Art

A rechargeable (or secondary) battery is designed to be repeatedly charged and discharged, different from a primary battery (or primary cell). A small rechargeable battery is often used for portable, small electronic devices, such as a mobile phone, a laptop computer, or a camcorder. A large capacity and high density rechargeable battery is used to store motor driving power or energy in hybrid vehicles and electric vehicles.

A rechargeable battery generally includes an electrode assembly for charging and discharging a current, a case for receiving (or accommodating) the electrode assembly and an electrolyte solution, and an electrode terminal connected to the electrode assembly and drawn outside of the case. The electrode assembly may be a jellyroll type formed by winding electrodes with a separation film.

Electric vehicles and energy storage devices need large capacity rechargeable battery modules including a plurality of battery cells. When a fire or an explosion happens to a battery cell of (or within) the battery module, a high temperature flame and/or gas discharged by the battery cell may reach neighboring battery cells and cause a chain explosion.

Hence, methods for preventing the above-described situation are needed. To this end, a potting method for covering a positive electrode of the battery cell with a foamed urethane or a silicon material may be used. The potting material protects the battery cell from air and moisture during ordinary use and conditions while foamed pores are generated during an emergency, such as a thermal runaway, to controllably discharge vent gas and debris from the battery cell. Thus, the potting material prevents the discharged debris from being transmitted to the adjacent battery cells and, thus, prevents a chain reaction or explosion.

The potting material, however, is expensive and difficult to process, so it increases total processing costs of the rechargeable battery module. Further, the potting material permeates into a space between a cap assembly in a cylindrical battery and can stop a vent from opening in the battery cell, causing side effects such as a side rupture.

The above information disclosed in this Background section is for enhancement of understanding of the background of the present disclosure, and therefore, it may contain information that does not form the prior art that is already known to a person of ordinary skill in the art.

SUMMARY

Embodiments of the present disclosure provide a rechargeable battery module that can prevent a chain explosion of peripheral battery cells by providing smooth vent opening during an emergency.

A rechargeable battery module, according to an embodiment of the present disclosure, includes: a plurality of battery cells, each of the battery cells having a vent hole; a first holder accommodating one side of the battery cells; a second holder accommodating an opposite side of the battery cells, the second holder being coupled to the first holder with the battery cells therebetween; a first plate on one side of the second holder and an outlet group, the outlet group including a plurality of outlets at positions corresponding to the vent holes of a respective one of the battery cells; and a second plate on one side of the first plate and configured to intercept an emission discharged through the vent hole and the outlet group.

The battery cells may be cylindrical rechargeable batteries.

The outlets may have a first width in a diameter direction and a first length in a circumferential direction, and the outlets may have a first gap therebetween in the circumferential direction.

The outlet group may have an entire area between an external first diameter and an internal second diameter, the entire area may include an opened area formed by the outlets and a closed area formed by a space between adjacent ones of the outlets, and a ratio of the closed area to the entire area may be greater than 10.78% and less than 31.3%.

The ratio of the closed area to the entire area may be greater than 10.78% and equal to or less than 15.4%.

The ratio of the closed area to the entire area may be greater than 15.4% and less than 31.3%.

The outlets may be first outlets, and the outlet group may have a plurality of second outlets extending along an exterior circumference of the first outlets.

The first outlets may have a first width in the diameter direction and a first length in the circumferential direction, the first outlets may have a first gap therebetween in the circumferential direction, the second outlets may have a second width in the diameter direction and a second length in the circumferential direction, and the second outlets may have a second gap therebetween in the circumferential direction.

The first outlets may form a first entire area between an external first diameter and an internal second diameter, the first entire area may include an opened area formed by the first outlets and a first closed area formed by a space between adjacent ones of the first outlets, the second outlets may form a second entire area between an external second diameter and an internal second diameter, the second entire area may include an opened area formed by the second outlets and a second closed area formed by a space between adjacent ones of the second outlets, and a ratio of a sum of the first closed area and the second closed area to a sum of the first entire area and second entire area may be greater than 10.78% and less than 31.3%.

The ratio of a sum of the first closed area and the second closed area to a sum of the first entire area and the second entire area may be greater than 10.78% and equal to or less than 15.4%.

The ratio of a sum of the first closed area and the second closed area to a sum of the first entire area and the second entire area may be greater than 15.4% and less than 31.3%.

According to embodiments of the present disclosure, outlet groups are formed in the first plate such that the respective outlets of each of the outlet groups correspond to the vent holes of the corresponding battery cells. Further, the outlets can smoothly open during an emergency to discharge explosion pressures, flame, and debris to the outside of the first plate while the outlets of other outlet groups corresponding to battery cells not experiencing an emergency do not open, thereby preventing the chain explosion of the adjacent battery cells inside the first plate.

DETAILED DESCRIPTION

The present disclosure will be described more fully hereinafter with reference to the accompanying drawings, in which embodiments of the present disclosure are shown. As those skilled in the art would realize, the described embodiments may be modified in various different ways, all without departing from the spirit and scope of the present disclosure. Thus, the drawings and description are to be regarded as illustrative in nature and not restrictive.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Figure 1:
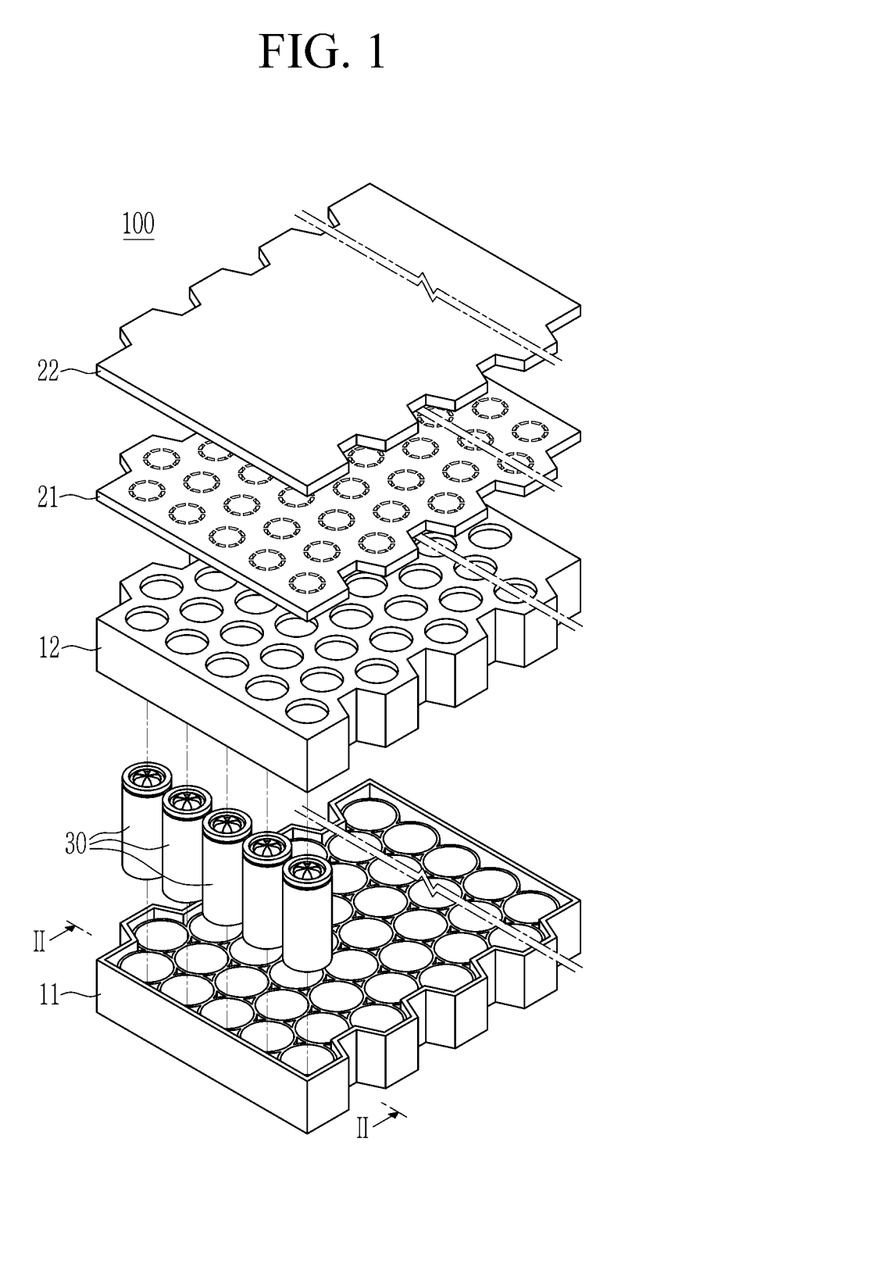
FIG. 1 is an exploded perspective view of a rechargeable battery module according to an embodiment of the present disclosure.
Figure 2:
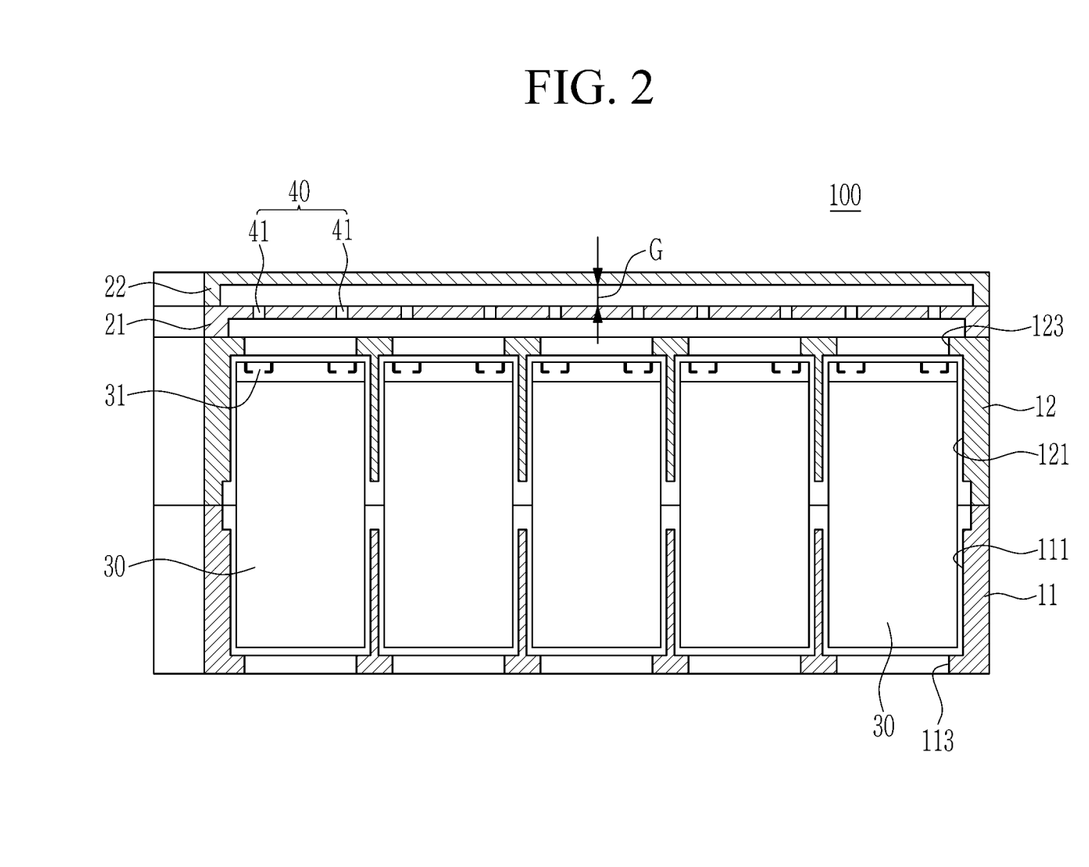
FIG. 2 is a cross-sectional view taken along the line II-II of FIG. 1.

FIG. 1 is an exploded perspective view of a rechargeable battery module according to an embodiment of the present disclosure, and FIG. 2 is a cross-sectional view taken along the line II-II of FIG. 1. Referring to FIG. 1 and FIG. 2, the rechargeable battery module 100 includes a plurality of battery cells 30, a first holder 11, a second holder 12, a first plate 21, and a second plate 22. In one embodiment, the battery cells 30 may be cylindrical rechargeable batteries having a vent hole (e.g., a vent opening) 31 (see, e.g., FIG. 3).

Figure 3:
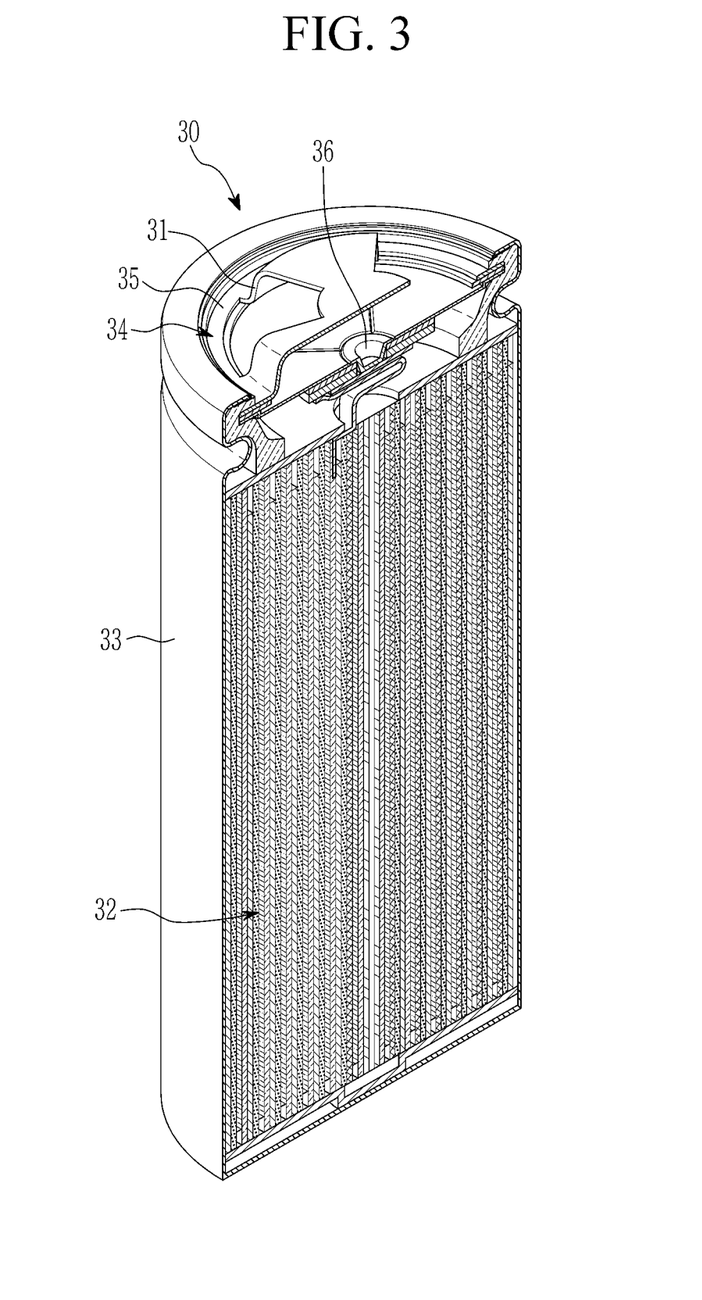
FIG. 3 is a cross-sectional perspective view of a cylindrical battery cell in the rechargeable battery module shown in FIG. 1.

FIG. 3 is a cross-sectional perspective view of a cylindrical battery cell applied to the rechargeable battery module 100 shown in FIG. 1. Referring to FIG. 3, the cylindrical battery cell 30 includes an electrode assembly 32 for performing a charging and discharging, a case 33 accommodating the electrode assembly 32, and a cap assembly 34 electrically connected to the electrode assembly 32 and combined to (and sealing) an opening in the case 33 while being insulated therefrom. The cap assembly 34 includes a cap plate 35, and the cap plate 35 may include the vent hole 31 through which an emission (e.g., gas and/or debris) may discharge when a vent 36 bursts. The emission includes vent gas, explosion pressures, flame, and/or debris.

Referring to FIG. 1 and FIG. 2, the first holder 11 forms a plurality of first receivers (e.g., first or lower receiving spaces) 111 to receive a first side (e.g., a lower portion) of the battery cells 30 and support the same. The second holder 12 forms a plurality of second receivers (e.g., second or upper receiving spaces) 121 to receive a second side (e.g., an upper portion) of the battery cells 30 and support the same. The second holder 12 is combined to the first holder 11 to receive the battery cells 30 within the first and second receivers 111 and 121.

For example, the first holder 11 includes a first protrusion 113 to support a first-side lower portion of the battery cell 30, and the second holder 12 includes a second protrusion 123 to support a second-side upper portion of the battery cell 30. The first and second protrusions 113 and 123 prevent the battery cell 30 from moving upwardly or downwardly (in the drawings) between the first and second holders 11 and 12.

The first plate 21 is provided on a first-side upper portion of the second holder 12 and includes outlet groups 40 respectively formed of a plurality of outlets 41 at positions corresponding to the respective vent holes 31 of the corresponding battery cell 30. For example, the first plate 21 may be formed by plastic injection molding.

The second plate 22 is disposed on a first-side upper portion of the first plate 21 and is connected to the vent hole 31 and the outlets 41 in the outlet group 40 to block the emission discharged through the vent hole 31. For example, the second plate 22 intercepts the vent gas, explosion pressure, flame, and debris discharged through the vent hole 31.

For this purpose, a gap G is formed between the first and second plates 21 and 22 in an up and down direction (in the drawings). The space between the first and second plates 21 and 22 formed by the gap G buffers the explosion pressure, radiates the flame, and block the debris to prevent the same from being scattered outside of the rechargeable battery module 100.

Figure 4:
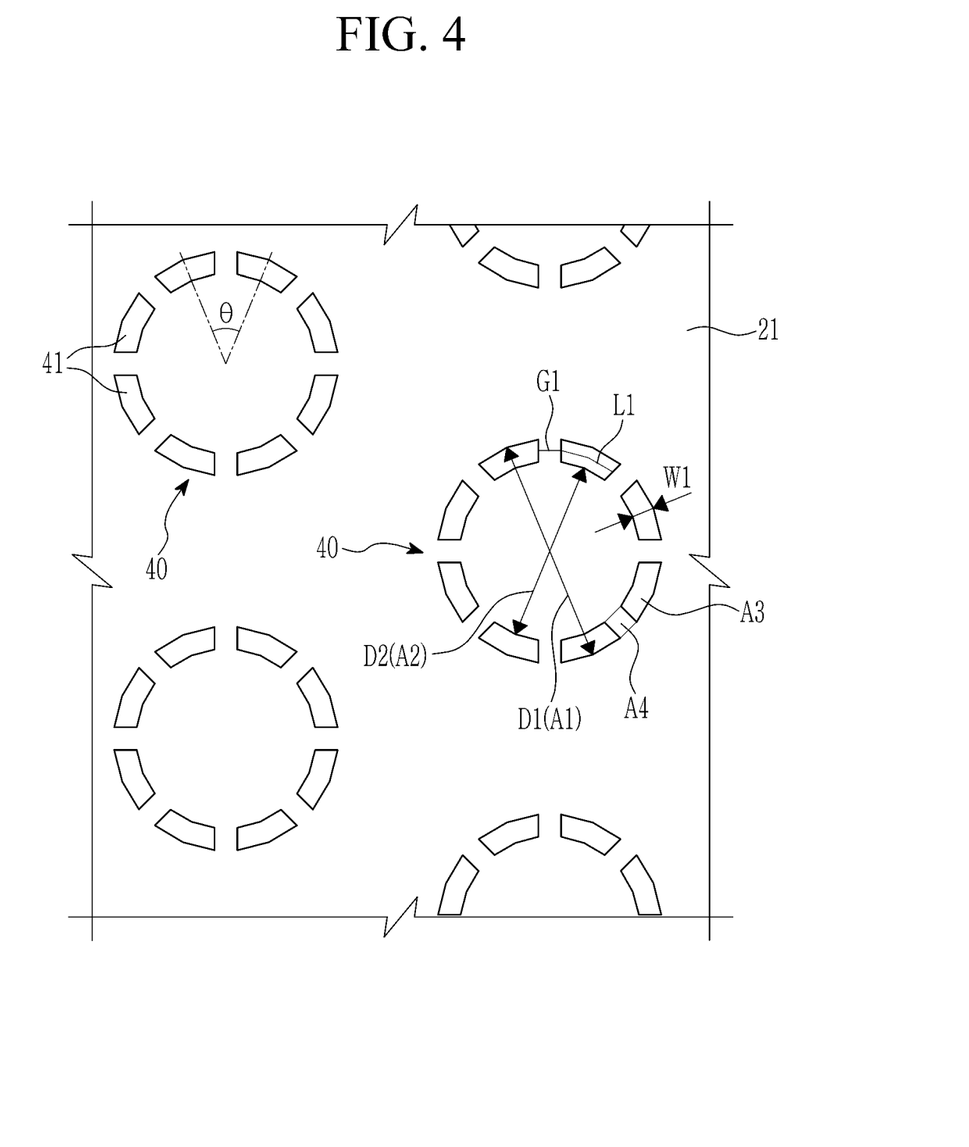
FIG. 4 is a partial top plan view of a first plate shown in FIG. 1.
Figure 5:
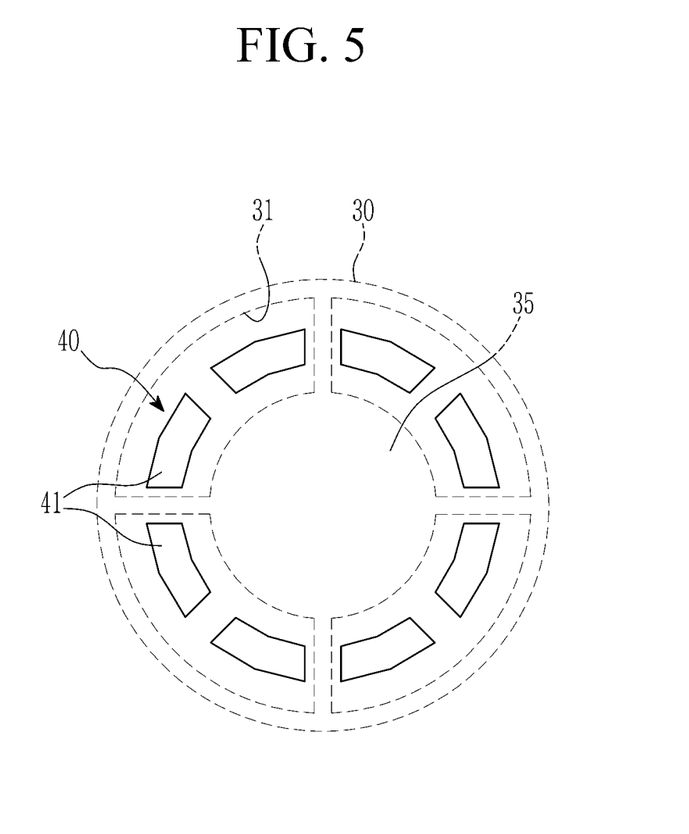
FIG. 5 is a top plan view of an outlet relationship of the first plate shown in FIG. 4 with a vent hole of a battery cell as shown in FIGS. 1 and 2.

FIG. 4 is a partial top plan view of the first plate shown in FIG. 1, and FIG. 5 is a top plan view of an outlet relationship of the first plate shown in FIG. 4 with the vent hole of the battery cell shown in FIG. 1 and FIG. 2.

Referring to FIG. 1 to FIG. 5, regarding one of the outlet groups 40 in the first plate 21, the outlet 41 has a first width W1 in a diameter direction thereof and has a first length L1 in a circumferential direction thereof. The first length L1 represents a length of a curve extending along a middle of the first width W1 of the outlets 41 of one of the outlet groups 40. The outlet group 40 includes a plurality of the outlets 41 having a first gap G1 therebetween in the circumferential direction. The first gap G1 represents a length of the curve extending along the middle of the first width W1 between two neighboring ones of the outlets 41.

The outlets 41 are formed into outlet groups 40, and the adjacent outlets 41 within one of the outlet groups 40 may have an angle ($\theta$) (e.g., a center to center angle) in a range of about 15° to about 60° with respect to the first length L1. For example, in the illustrated embodiment, the outlet group 40 includes eight outlets 41, and two adjacent outlets 41 have an angle ($\theta$) of about there between 45° with respect to the first length L1. The number of the outlets 41 within each outlet group 40 determines (or affects) performance for intercepting the discharged explosion pressures, flame, and debris. When the number of the outlets 41 is set, the performance for intercepting the discharged explosion pressures, flame, and debris is determined by the sizes of the first width W1, the first length L1, and the first gap G1 of the outlets 41 of the outlet group 40.

The outlet group 40 has an entire area (A1-A2) between an external first diameter D1 and an internal second diameter D2. That is, the first diameter D1 forms the first area A1, and the second diameter D2 forms the second area A2. Therefore, the entire area (A1-A2) of the outlet group 40 is calculated by subtracting the second area A2 from the first area A1.

In one embodiment, the entire area (A1-A2) of the outlet group 40 includes an opened area (A3*N, wherein N is the number of outlets) determined by the number of outlets 41 and a closed area (A4*N) determined by a space between adjacent ones of the outlets 41. In the illustrated embodiment, the opened area (A3*N) is A3*8, and the closed area (A4*N) is A4*8. In some embodiment, an area ratio ((A4*N)/(A1-A2)) of the closed area (A4*N) for the entire area (A1-A2) of the outlet group 40 is greater than about 10.78% and less than about 31.3%.

When the area ratio ((A4*N)/(A1-A2)) is equal to or less than about 10.78%, molding becomes difficult during injection. When the area ratio ((A4*N)/(A1-A2)) is greater than about 10.78% and equal to or less than about 15.4%, the injection molding is possible, and the outlets 41 operate normally in response to the explosion pressure, flame, and debris discharged through the vent hole 31 of the corresponding battery cell 30. Therefore, the entire area (A1-A2) of the outlet group 40 established by the outlets 41 over the battery cell 30 experiencing an emergency ruptures (or opens), and the outlet groups 40 of the first plate 21 over the normal battery cells 30 that are not experiencing an emergency (e.g., are not venting) maintain a normal state (e.g., do not open or rupture). By this, the outlets 41 are smoothly opened during an emergency but the chain explosion of the peripheral battery cells 30 may be prevented.

The area ratio ((A4*N)/(A1-A2)) of the closed area (A4*N) to the entire area (A1-A2) of the outlet group 40 may be greater than about 15.4% and less than about 31.3%. When the area ratio ((A4*N)/(A1-A2)) is greater than about 15.4% and less than about 31.3%, the outlets 41 normally operate in response to the explosion pressure, flame, and debris discharged from the vent hole 31 of the corresponding battery cell 30. In other words, the entire area (A1-A2) of the outlet group 40 established by the outlets 41 ruptures (or opens) while the outlet groups 40 of the first plate 21 over the normal battery cells 30 that are not experiencing an emergency may be maintained in the normal state (e.g., may not rupture or open). Hence, the outlets 41 are smoothly opened in in an emergency, thereby preventing the chain explosion of the peripheral battery cells 30.

When the area ratio ((A4*N)/(A1-A2)) of the closed area (A4*N) to the entire area (A1-A2) of the outlet group 40 is equal to or greater than about 31.3%, the entire area (A1-A2) of the outlet group 40 may not be normally operated (e.g., may not rupture as expected) and, instead, the entire first plate 21 may be removed by the discharged explosion pressure, flame, and debris.

Figure 6:
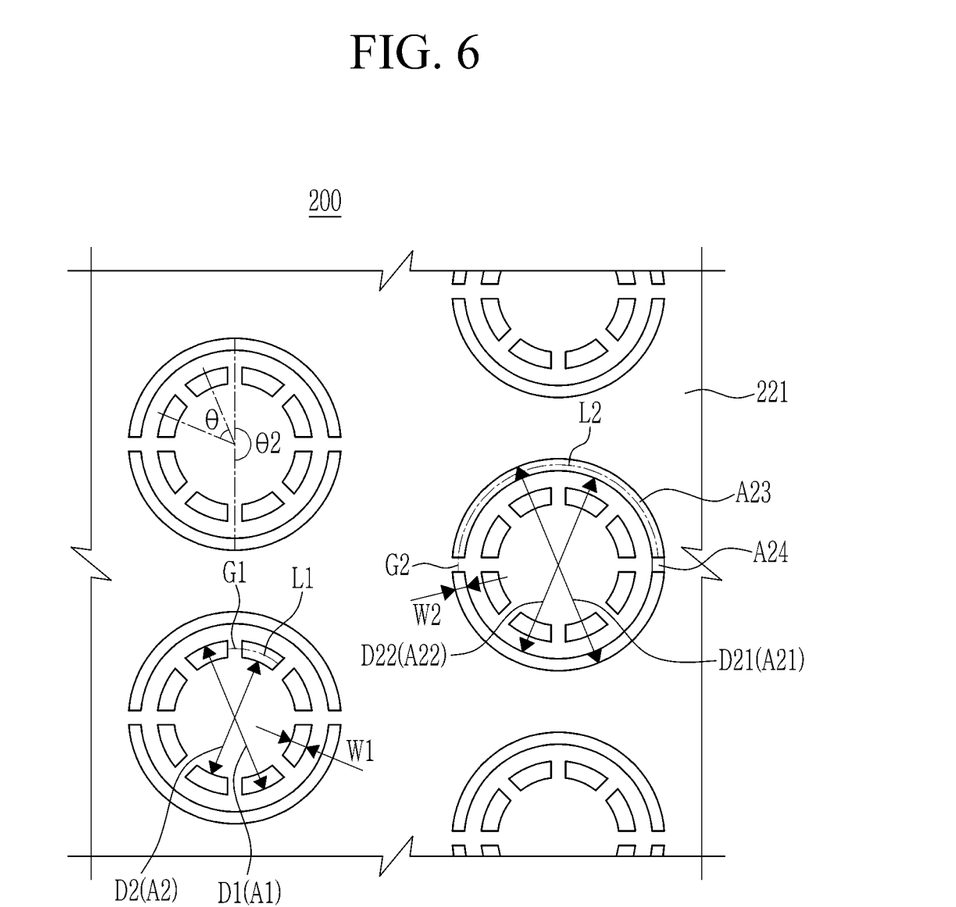
FIG. 6 is a top plan view of a first plate according to another embodiment of the present disclosure.
Figure 7:
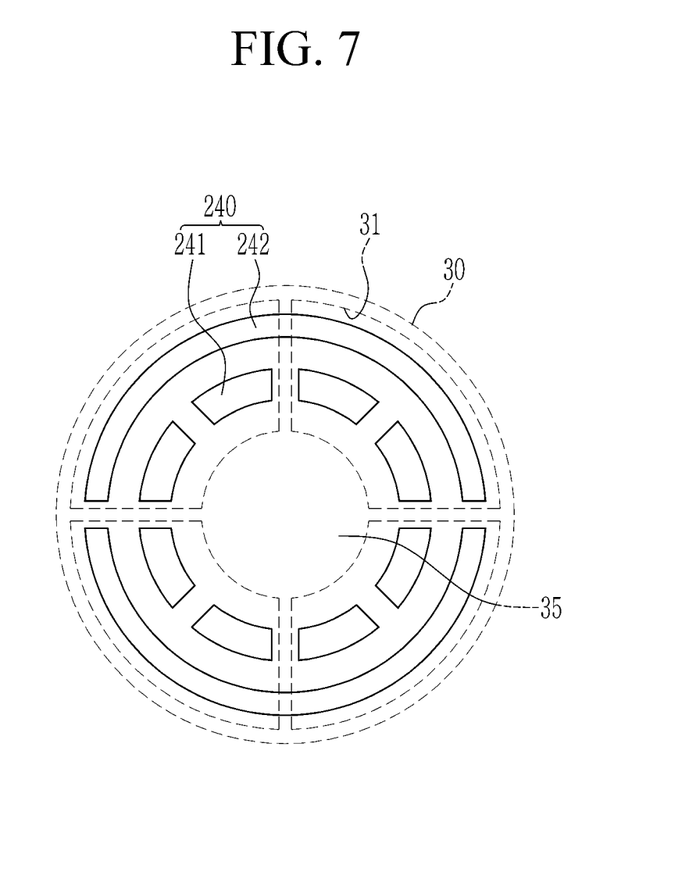
FIG. 7 is a top plan view of an outlet relationship of the first plate shown in FIG. 6 and a vent hole of a battery cell as shown in FIGS. 1 and 2.

FIG. 6 is a top plan view of a first plate according to another embodiment of the present disclosure, and FIG. 7 is a top plan view of an outlet relationship of the first plate shown in FIG. 6 over the vent hole of the battery cell shown in FIG. 3. This embodiment will be compared with the above-described embodiment. Thus, the same or substantially similar portions therebetween will not be described and different portions will be described.

Referring to FIG. 6 and FIG. 7, a rechargeable battery module 200 according to another embodiment includes a first plate 221 is installed on the first-side upper portion of the second holder 12. The first plate 221 includes outlet groups 240 including a plurality of first outlets 241 and second outlets 242. The outlet groups 240 of the first plate 221 respectively correspond to the vent holes 31 in the battery cells 30.

That is, each of the outlet groups 240 includes a plurality of first outlets 241 corresponding to the vent hole 31 and a plurality of second outlets 242 on (or extending along) an exterior circumference of the first outlets 241. For example, the first outlets 241 may be inside, in the diameter direction of the corresponding outlet group 240, with respect to the second outlets 242.

The first outlet 241 has the first width W1 in the diameter direction and has the first length L1 in the circumferential direction. The first length L1 represents the length of a curve extending along the middle of the first width W1. Adjacent ones of the first outlets 241 have a first gap G1 therebetween in the circumferential direction. The first gap G1 represents the length of the curve extending along the middle of the first width W1 between the two neighboring ones of the first outlets 241.

In the illustrated embodiment, the outlet group 240 includes eight first outlets 241, and two adjacent ones of the first outlets 241 have an angle of about 45° (θ) therebetween with respect to the first length L1. The number of the first outlets 241 within each outlet group 240 affects the performance for intercepting some of the explosion pressure, flame, and debris. When the number of the first outlets 241 is established, the performance for intercepting some of the explosion pressure, flame, and debris discharged is further affected by the sizes of the first width W1, the first length L1, and the first gap G1 of the first outlet 241.

The second outlets 242 have a second width W2 in the diameter direction and have a second length L2 in the circumferential direction. The second length L2 represents the length of a curve extending along the middle of the second width W2. The second outlets 242 have a second gap G2 therebetween in the circumferential direction. The second gap G2 represents the length of a curve established between the two neighboring ones of the second outlets 242 in the middle of the second width W2.

Each of the outlet groups 240 includes multiple second outlets 242, and adjacent ones of the second outlets 242 may have an angle (θ2) in a range of about 90° to about 180° therebetween with respect to the second length L2. For example, in the illustrated embodiment, two adjacent second outlets 242 are formed and have an angle (θ2) of about 180° therebetween with respect to the second length L2. The number of the second outlets 242 controls (or affects) performance for intercepting the remaining portion of the explosion pressure, flame, and debris discharged. When the number of the second outlets 242 is established, the sizes of the second width W2, the second length L2, and the second gap G2 further control (or affect) the performance for intercepting the remaining portion of the explosion pressure, flame, and debris discharged.

Similar to the outlet group 40 according to the above-described embodiment, the first outlets 241 form the first entire area (A1-A2) between the external first diameter D1 and the internal second diameter D2. That is, the first diameter D1 forms a first area A1, and the second diameter D2 forms a second area A2. Therefore, the entire first area (A1-A2) of the first outlets 241 of the outlet group 240 is calculated by subtracting the second area A2 from the first area A1.

The first entire area (A1-A2) includes an opened area (A3*N) formed by the plurality of first outlets 241 and a first closed area (A4*N) formed by a space between the plurality of first outlets 241 in the region of the first outlets 241.

The second outlets 242 form the second entire area (A21-A22) between the external second diameter D21 and the internal second diameter D22. That is, the second diameter D21 forms the first area A21, and the second diameter D22 forms the second area A22. Hence, the entire second area (A21-A22) is calculated by subtracting the second area A22 from the first area A21 in the region of the second outlets 242 of the outlet group 240.

In the region of the second outlets 242, the second entire area (A21-A22) includes an opened area (A23*N) formed by the plurality of second outlets 241 and a second closed area (A24*N) formed by a space between the plurality of second outlets 242.

In the outlet group 240, an area ratio of the sum of the first closed area (A4*N) and the second closed area (A24*N) to the sum of the first entire area (A1-A2) and the second entire area (A21-A22), that is, the area ratio (((A4*N)+(A24*N))/((A1-A2)+(A21-A22))) of the closed area ((A4*N)+(A24*N)) to the entire area ((A1-A2)+(A21-A22)) may be greater than about 10.78% and less than about 31.3%.

When the area ratio (((A4*N)+(A24*N))/((A1-A2)+(A21-A22))) is equal to or less than about 10.78%, molding becomes difficult during injection. When the area ratio (((A4*N)+(A24*N))/((A1-A2)+(A21-A22))) is greater than about 10.78% and equal to or less than about 15.4%, the injection molding is possible, and the first outlets 241 and the second outlets 242 are normally operated (e.g., normally rupture) by the explosion pressure, flame, and debris discharged by the vent hole 31 of the corresponding battery cell 30. Therefore, the first and second entire areas (A1-A2 and A21-A22) of the outlet group 240 established with the first outlets 241 and the second outlets 242 are ruptured (or opened), and the outlet groups 240 of the first plate 21 over the normal battery cells 30 that are not exploded are maintained in the normal state (e.g., do not rupture). Hence, because the first outlets 241 and the second outlets 242 are smoothly opened during an emergency, the chain explosion of the peripheral battery cells 30 may be prevented.

The area ratio (((A4*N)+(A24*N))/((A1-A2)+(A21-A22))) of the outlet group 240 may be greater than about 15.4% and less than about 31.3%. When the area ratio (((A4*N)+(A24*N))/((A1-A2)+(A21-A22))) is greater than about 15.4% and less than about 31.3%, the first outlets 241 and the second outlets 242 are normally operated by the explosion pressure, flame, and debris discharged by the vent hole 31 of the corresponding battery cell 30. Therefore, the first and second entire areas (A1-A2 and A21-A22) of the outlet group 240 established with the first outlets 241 and the second outlets 242 are removed (e.g., rupture and open), and the outlet groups 240 of the first plate 21 over the normal battery cells 30 that are not exploded may be maintained at the normal state (e.g., may not rupture). Hence, the first outlets 241 and the second outlets 242 are smoothly opened in an emergency, thereby preventing the chain explosion of the peripheral battery cells 30.

However, when the area ratio $(((A4*N)+(A24*N))/((A1-A2)+(A21-A22)))$ of the outlet group 240 is equal to or greater than about 31.3%, the entire first and second areas (A1-A2 and A21-A22) of the first outlets 241 and the second outlets 242 may not be normally operated (e.g., may not rupture in response to an exploding battery cell), and instead, the first plate 21 may be entirely removed by the discharged explosion pressure, flame, and debris.

While the present disclosure has been described in connection with what is presently considered to be practical embodiments, it is to be understood that the present disclosure is not limited to the disclosed embodiments. The present disclosure is intended to cover various modifications and equivalent arrangements included within the scope of the appended claims and their equivalents.

| Description of Some Reference Symbols | |
| --- | --- |
| 11: first holder | 12: second holder |
| 21, 221: first plate | 22: second plate |
| 30: battery cell | 31: vent hole |
| 32: electrode assembly | 33: case |
| 34: cap assembly | 35: cap plate |
| 36: vent | 40, 240: outlet group |
| 41: outlet | 100, 200: rechargeable battery module |
| 111: first receiver | 113: first protrusion |
| 121: second receiver | 123: second protrusion |
| 241: first outlet | 242: second outlet |
| A1: first area | A2: second area |
| A1-A2: first entire area | A3: opened area |
| A4: closed area | A21: first area |
| A22: second area | A21-A22: second entire area |
| A23: second opened area | A24: second closed area |
| D1: first diameter | D2: second diameter |
| D21: second-1 diameter | D22: second-2 diameter |
| G: gap | G1: first gap |
| G2: second gap | L1: first length |
| L2: second length | W1: first width |
| W2: second width | θ, θ2: angle |

What is claimed is:

1. A rechargeable battery module comprising:
a plurality of battery cells, each of the plurality of battery cells having a vent hole;
a first holder accommodating one side of the plurality of battery cells;
a second holder accommodating an opposite side of the plurality of battery cells, a lower side of the second holder being coupled to the first holder with the plurality of battery cells therebetween, the second holder comprising protrusions at an upper side of the second holder, the protrusions respectively supporting one of the plurality of battery cells;
a first plate on the upper side of the second holder and comprising an outlet group, the outlet group comprising a plurality of outlets at positions corresponding to the vent holes of a respective one of the plurality of battery cells; and
a second plate on an upper side of the first plate and configured to block an emission discharged through the vent hole and the outlet group,
wherein the first holder, the second holder, the first plate, and the second plate are sequentially stacked on each other in a first direction.

2. The rechargeable battery module of claim 1, wherein the plurality of battery cells are cylindrical rechargeable batteries.

3. The rechargeable battery module of claim 1, wherein the outlets have a first width in a diameter direction and a first length in a circumferential direction, and
wherein the outlets have a first gap therebetween in the circumferential direction.

4. The rechargeable battery module of claim 3, wherein the outlet group has an entire area between an external first diameter and an internal second diameter,
wherein the entire area includes an opened area formed by the outlets and a closed area formed by a space between adjacent ones of the outlets, and
wherein a ratio of the closed area to the entire area is greater than 10.78% and less than 31.3%.

5. The rechargeable battery module of claim 4, wherein the ratio of the closed area to the entire area is greater than 10.78% and equal to or less than 15.4%.

6. The rechargeable battery module of claim 4, wherein the ratio of the closed area to the entire area is greater than 15.4% and less than 31.3%.

7. The rechargeable battery module of claim 1, wherein the outlets are first outlets, and
wherein the outlet group has a plurality of second outlets extending along an exterior circumference of the first outlets.

8. The rechargeable battery module of claim 7, wherein the first outlets have a first width in a diameter direction and a first length in a circumferential direction,
wherein the first outlets have a first gap therebetween in the circumferential direction,
wherein the second outlets have a second width in the diameter direction and a second length in the circumferential direction, and
wherein the second outlets have a second gap therebetween in the circumferential direction.

9. The rechargeable battery module of claim 8, wherein the first outlets form a first entire area between an external first diameter and an internal second diameter,
wherein the first entire area includes an opened area formed by the first outlets and a first closed area formed by a space between adjacent ones of the first outlets,
wherein the second outlets form a second entire area between an external second diameter and an internal second diameter,
wherein the second entire area includes an opened area formed by the second outlets and a second closed area formed by a space between adjacent ones of the second outlets, and
wherein a ratio of a sum of the first closed area and the second closed area to a sum of the first entire area and second entire area is greater than 10.78% and less than 31.3%.

10. The rechargeable battery module of claim 9, wherein the ratio of a sum of the first closed area and the second closed area to a sum of the first entire area and the second entire area is greater than 10.78% and equal to or less than 15.4%.

11. The rechargeable battery module of claim 9, wherein the ratio of a sum of the first closed area and the second closed area to a sum of the first entire area and the second entire area is greater than 15.4% and less than 31.3%.

* * * * *